United States Patent [19]

Melino

[11] Patent Number: 5,751,333
[45] Date of Patent: May 12, 1998

[54] DYNAMIC CONTROL OF A ROS DIODE LASER TO IMPROVE OUTPUT IMAGING

[75] Inventor: Robert H. Melino, Webster, N.Y.

[73] Assignee: Xerox Corporation, Stamford, Conn.

[21] Appl. No.: 558,618

[22] Filed: Nov. 14, 1995

Related U.S. Application Data

[63] Continuation of Ser. No. 247,192, May 20, 1994.

[51] Int. Cl.$^6$ .............................. B41J 2/47; B41J 4/435; H01S 3/00; G01D 15/14
[52] U.S. Cl. ........................... 347/247; 347/252; 347/253
[58] Field of Search ........................... 347/237, 238–247, 347/252, 253, 255, 240

[56] References Cited

U.S. PATENT DOCUMENTS

| | | |
|---|---|---|
| 5,049,897 | 9/1991 | Ng ........................................... 347/250 |
| 5,142,403 | 8/1992 | Ossman ................................... 359/216 |
| 5,223,857 | 6/1993 | Loce et al. .............................. 347/255 |

*Primary Examiner*—Benjamin R. Fuller
*Assistant Examiner*—Raquel Yvette Gordon

[57] ABSTRACT

The present invention discloses a dynamic control of a drive circuit to a diode laser used in a raster output scanning system. In the prior art, the binary serial stream input to a diode laser operates on the laser to pulse the laser on when a "one" input is applied, the laser staying on when the first one input is immediately followed by successive one inputs. The first on pixel creates an exposure at an image plane which is less than uniform due to the characteristics of the drive circuit due to the overshoot or undershoot characteristics of the drive circuit. The second and succeeding pixels following the first pixel turned on will be at a maximum exposure value and hence will have an undesirable exposure contrast with the first pixel. The present invention adds delay circuitry to the drive circuits of the diode laser to introduce a gating signal which delays the application of the pixel stream to the laser diode in such a way that each successive on pulse is cycled on and off therefore each exposure value of each on pixel is exactly the same. Additional circuitry is included to compensate for the loss of exposure by increasing the laser diode output.

8 Claims, 4 Drawing Sheets

DYNAMIC CONTROL OF A ROS DIODE LASER TO IMPROVE OUTPUT IMAGING

This is a continuation of application Ser. No. 247,192, filed May 20, 1994.

BACKGROUND AND MATERIAL DISCLOSURE STATEMENT

This invention relates to a raster output scanner (ROS) which uses a diode laser as a light source, and more particularly, to improving the quality of the image formed by the modulated laser output at a scan line at an image plane.

Semiconductor diode lasers have been conventionally used as coherent light sources in raster output scanners. A modulated laser output beam is swept across a surface of a photosensitive image plane such as a photoreceptor belt or drum. The laser output passes through conditioning optics to illuminate the facets of a rotating polygon. After reflection from the facet, the light beam passes through further conditioning optics to form a beam which sweeps across the image surface, each sweep referred to as a scan line. During each scan line the laser beam is turned on or off in conformance with a video signal applied to the laser. This creates dark (charged) or light (uncharged) picture elements called pixels. In general, the video signals may be characterized as serial stream of binary pulses where a logic one (pulse) specifies that the beam is to illuminate the image surface while a logic zero (no pulse) will result in no illumination. Examples of prior art laser diode ROS systems are provided by U.S. Pat. No. 5,142,403, issued to Ossman on 25 Aug. 1992 and entitled, "ROS Scanner Incorporating Cylindrical Mirror In Pre-Polygon Optics," and U.S. Pat. No. 5,049,897, issued to Ng on 17 Sep. 1991 and entitled, "Method and Apparatus for Beam Displacement in a Light Beam Scanner". The actual pixel exposure at the image plane is dependent on several factors including turn on characteristics of the laser diode as well as droop characteristics which are manifested as a drop off in illumination due to transient diode junction heating following some operating time interval. These characteristics are well understood and the output exposure can be predicted. However, there is another source of image degradation associated with the turn on characteristics of diode lasers.

FIG. 1 shows a single pixel exposure level at an image plane during a pixel clock period; the image plane, for example, being an image plane 22 shown in U.S. Pat. No. 5,142,403. During a pixel clock period, the video data used to drive the diode laser is clocked so that the period during which each pixel is exposed is the same. The pulse exhibits a rise time at the beginning of the exposure level and, for this case, the drive components cause the pulse to cause an undershoot of the drive signal. The exposure is thus less than the maximum possible compared with the entire pixel period being filled. For some cases, this exposure reduction can be up to 20% less than maximum possible exposure.

FIG. 2 shows the application of two successive "on" video pulses to the laser. It is noted here that the laser remains on during the first on pulse. It is observed that the second pixel exposure is at a maximum while the exposure period (area under the curve) for the first time pixel is less than the exposure period of the second pixel. This phenomenon means that the exposure is greater for two adjacent pixels than it is for two pixels that are separated in time.

According to the present invention, circuitry is introduced to the diode laser drive circuitry of the prior art to cycle the laser on and off after each pixel period. This would make the exposure identical for each pixel time as shown in FIG. 3. More particularly, the invention relates to a driving circuit for a diode laser comprising a:

- source of binary video data providing a serial stream of ones and zeros to the diode laser, each one or zero associated with turning the diode laser on or off, respectively, for each pixel time period and
- circuit means for modifying such serial stream so that each on pixel is turned off at the end of each pixel time period.

DESCRIPTION OF THE INVENTION

Figure 4:
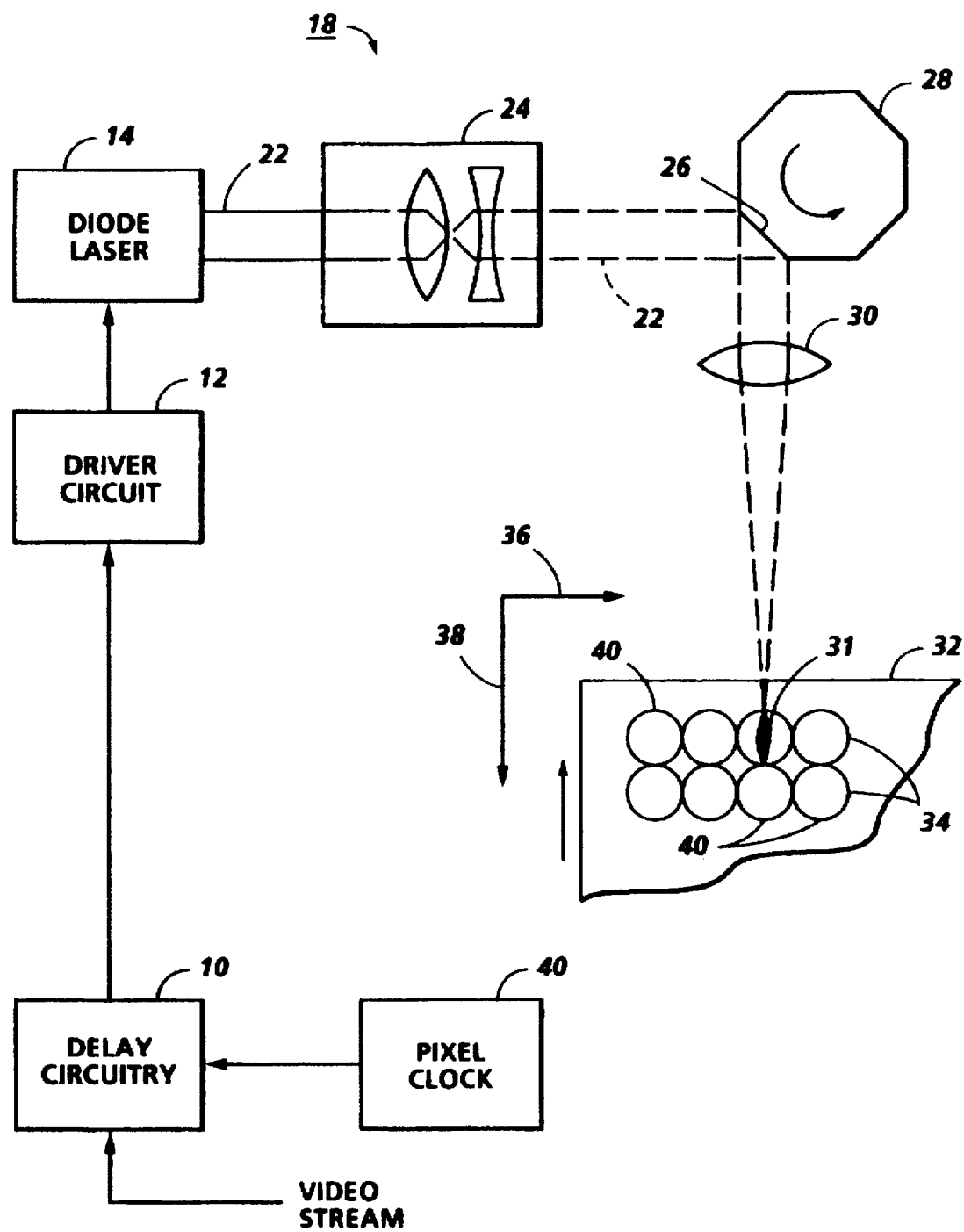
FIG. 4 is a schematic diagram of a ROS system using the dynamic control circuitry of the present invention.

FIG. 4 is a schematic diagram of a ROS system with a delayed pixel input to the driver 12 of a diode laser 14. A video stream of video data from an external source, or from image memory, contains a serial stream of ones and zeros. This video stream is ANDED with a delayed gating signal provided in delay circuit 10. The pixel output is applied to drive circuit 12 which modulates diode laser 14 to produce a modulated output in conformance with the video input. Laser beam output 22 passes into conditioning optics 24 and then illuminates a facet 26 of rotating polygon 28. After reflection from facet 26 laser beam 22 passes through an fΘ lens 30 and forms a spot on photosensitive image plane 32, a portion of which is shown in enlarged view. The rotating facet causes spot 31 to sweep across the image plane forming a succession of scan lines 34. Line 34 lies in what is commonly referred to as the fast scan direction, represented by arrow 36. In addition, as facet 26 is rotated, image plane 32 moves in a slow scan direction, substantially perpendicular to the fast scan direction, as represented by arrow 38. Movement in the slow scan direction is such that successive rotating facets of the polygon form successive scan lines 34 that are offset from each other in the slow scan direction.

Each scan line 34 consists of a row of pixels 40, the pixels being produced by the modulation of the laser beam as laser spot 31 scans across the image plane. As the beam scans across the scan line, spot 31 either illuminates, or does not illuminate, the individual pixel, in accordance with the pixel video signals.

Figure 1:
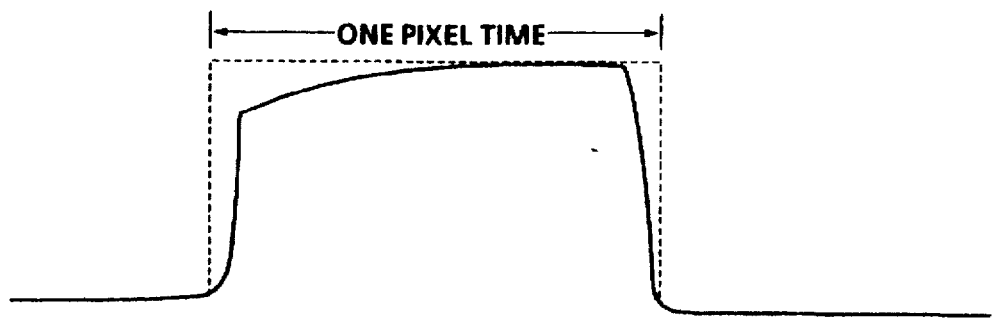
FIG. 1 shows an exposure at an image plane resulting from a single on pixel video input to a laser diode.
Figure 2:
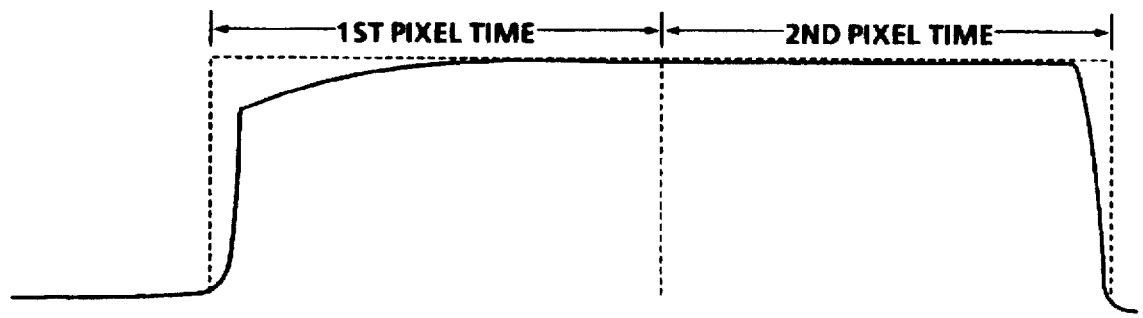
FIG. 2 shows the exposure resulting from two successive on pixel video inputs.
Figure 3:
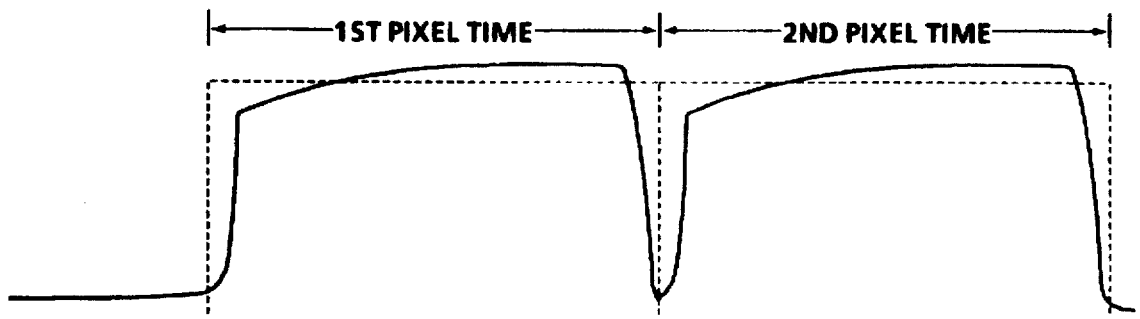
FIG. 3 shows two successive on pixel video input signals cycled on and off according to the invention to provide uniform exposure.
Figure 5:
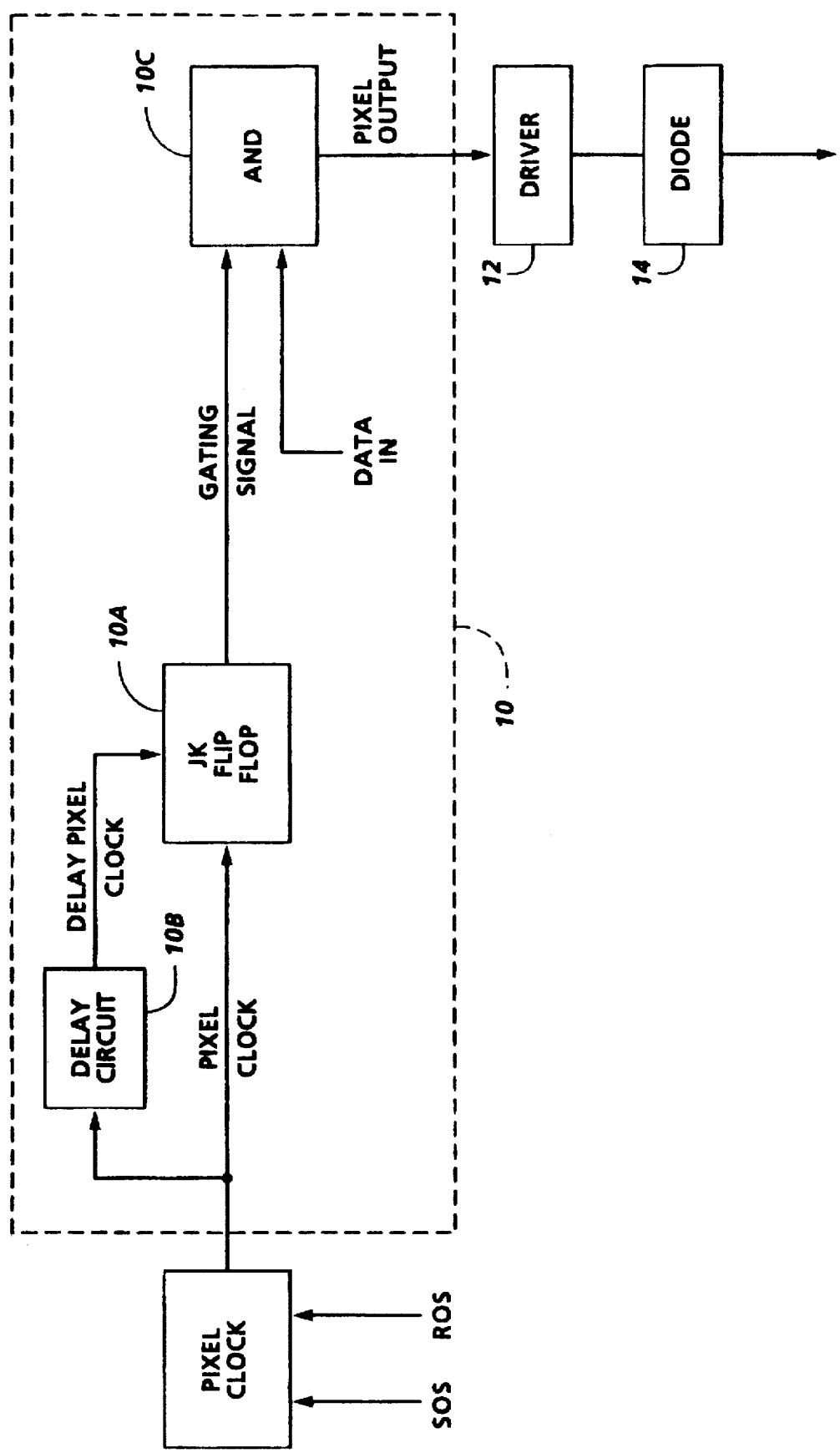
FIG. 5 is a block diagram of the dynamic control circuitry of FIG. 4.
Figure 6:
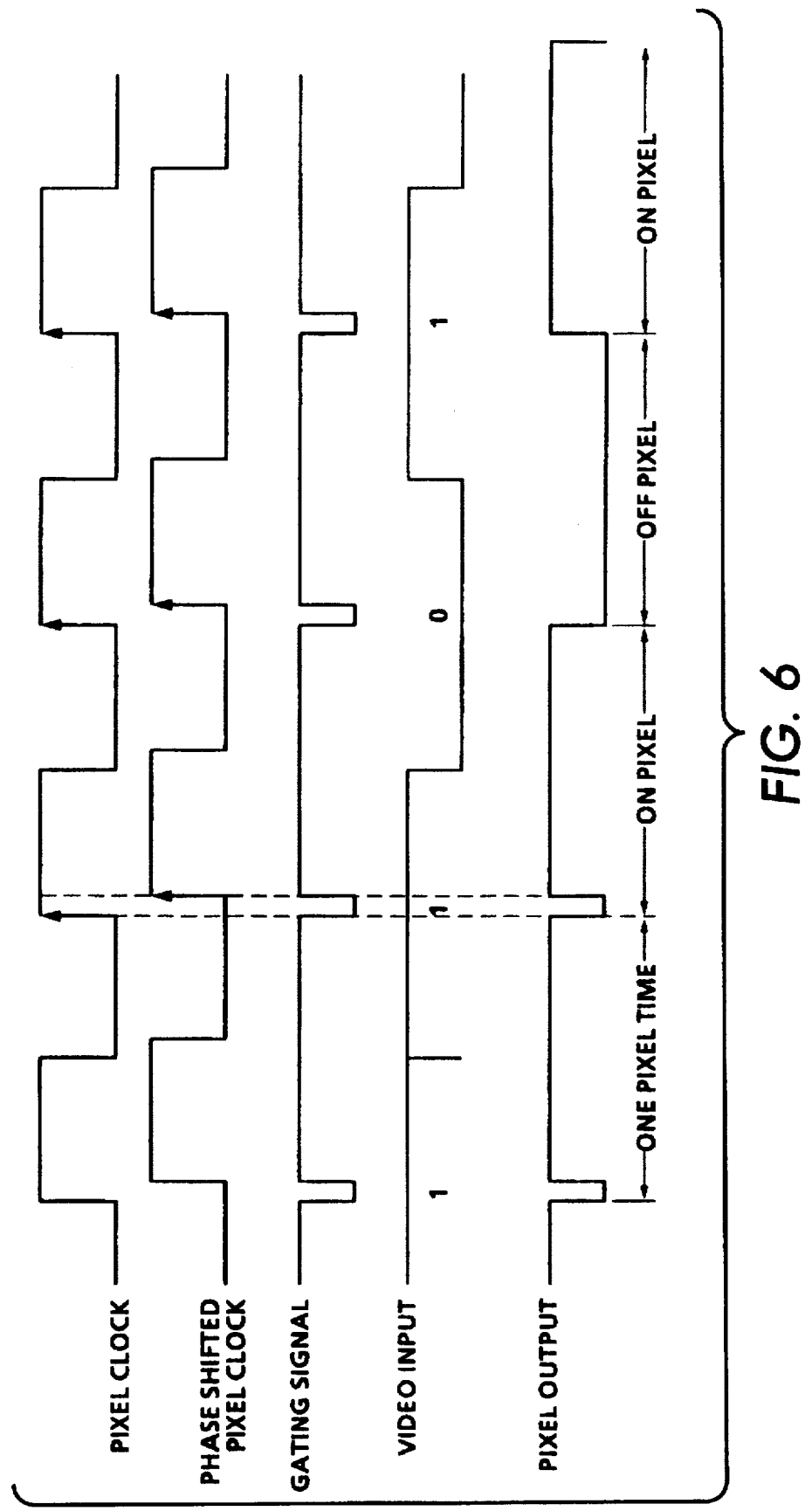
FIG. 6 shows the relationship between a pixel clock, the video stream and a delayed gating signal which contribute to the improved drive signals to the laser diode.

To demonstrate the purposes and the effects of the invention, it is assumed the video stream input to delay circuitry 10 consists of 2 "1", inputs one "0" input and one "1" as shown by VIDEO INPUT in FIG. 6. FIG. 5 shows in further detail one possible construction of delay circuit 10. Referring to FIGS. 5 and 6, a pixel clock signal is generated by a pixel clock 40. This clock is conventionally enabled by start of scan (SOS) signals generated by a sensor position in the path of beam 21 forming scan lines 34 (the SOS sensor is not shown but is well understood in the art). The clock is turned off by signals from an end of scan (EOS) sensor. The pixel clock is input to a rising edge triggered JK flipflop circuit 10A which, in turn, is triggered by pixel clock signals which have been delayed by delay circuit 10B. The output of flipflop 10A is a gating signal which forms one input of AND gate 10C. The other input is the video stream shown in FIG. 6. By ANDING the gating signal with the video data, a pixel output stream is sent to the laser driver 12 which cycles the diode laser 14 on and off for each pixel on period. In effect, the two successive one inputs are separated as shown in FIG. 3 into two separately defined pixels. Each on pixel will have the same characteristic exposure e.g., as in FIG. 1, and thus will be uniform. As one example, a 10% delay of the pixel clock introduced by circuit 10B will yield a 90% gating duty cycle. The off time between the two on pulses would be the minimum possible that the circuit is capable of. The slightly less exposure time will be compensated for by a slight increase in the operating level of the laser diode.

It will appreciated that the data input shown in FIG. 6 is representative only to demonstrate the separation of two adjacent pixels; many other video input patterns with greater strings of "on" pulses will be subject to the same separation and separate pulsing techniques.

While the embodiment disclosed herein is preferred, it will be appreciated from this teaching that various alternative, modifications, variations or improvements therein may be made by those skilled in the art, which are intended to be encompassed by the following claims:

I claim:

1. A laser diode circuit, comprising:

a laser diode for emitting laser light in response to laser drive current;

a pixel clock for creating pixel time periods;

video data comprised of a serial stream of first logic levels and of second logic levels, wherein the video data is a binary representation of pixels of an image, wherein the first logic levels are each associated with turning the laser diode ON during a pixel time period, and wherein the second logic levels are each associated with turning a diode laser OFF for a pixel time period; and a laser drive circuit for applying laser drive current to said diode laser in response to occurrences of the first logic levels such that laser light is emitted for a fixed portion of the pixel time period, wherein that fixed portion is less than a pixel time period.

2. The circuit of claim 1 wherein said video data includes first logic levels in consecutive pixel time periods.

3. A raster output scanner system, comprising:

a laser diode for emitting laser light in response to laser drive current;

a pixel clock for creating pixel time periods, each pixel time period having a beginning and an end;

video data comprised of a serial stream of first logic levels and of second logic levels, wherein the video data is a binary representation of pixels of an image, wherein the first logic levels are each associated with turning the laser diode ON during a pixel time period, and wherein the second logic levels are each associated with turning a diode laser OFF for a pixel time period;

a laser drive circuit for applying laser drive current to said diode laser in response to occurrences of the first logic levels such that laser light is emitted for a fixed portion of the pixel time period, wherein that fixed portion is less than a pixel time period;

a light receiving surface; and a rotating raster output scanner comprised of a plurality of light reflecting facet, said raster output scanner for receiving the laser light emitted from said laser diode and for sweeping that laser light across said light receiving surface.

4. The raster output scanner of claim 3 wherein said video data stream contains first logic levels in consecutive pixel time periods.

5. The raster output scanner of claim 3 wherein, said laser diode is turned off at the end of each pixel time period.

6. A printer, comprising:

a laser diode for emitting laser light in response to laser drive current;

a pixel clock for creating pixel time periods, each pixel time period having a beginning and an end;

video data comprised of a serial stream of first logic levels and of second logic levels, wherein the video data is a binary representation of pixels of an image, wherein the first logic levels are each associated with turning the laser diode ON during a pixel time period, and wherein the second logic levels are each associated with turning a diode laser OFF for a pixel time period;

a laser drive circuit for applying laser drive current to said diode laser in response to occurrences of the first logic levels such that laser light is emitted for a fixed portion of the pixel time period, wherein that fixed portion is less than a pixel time period;

a photosensitive surface; and a rotating raster output scanner comprised of a plurality of light reflecting facet, said raster output scanner for receiving the laser light emitted from said laser diode and for sweeping that laser light across said photosensitive surface so as to record a latent image therein.

7. The printer of claim 3, wherein said video data stream contains consecutive on pixels.

8. The printer of claim 3, wherein said laser diode is turned off at the end of each pixel time period.

* * * * *